(12) United States Patent
Zhang et al.

(10) Patent No.: US 12,377,381 B1
(45) Date of Patent: Aug. 5, 2025

(54) AIR CARBON CAPTURE ADSORPTION DEVICE AND LOW-RESISTANCE CARBON CAPTURE SYSTEM

(71) Applicant: DeCarbon Technology (Shenzhen) Co., Ltd., Guangdong (CN)

(72) Inventors: Zuotai Zhang, Guangdong (CN); Feng Yan, Guangdong (CN); Baohan Wang, Guangdong (CN); Jiyun Xu, Guangdong (CN)

(73) Assignee: DeCarbon Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/070,001

(22) Filed: Mar. 4, 2025

(30) Foreign Application Priority Data

Jun. 7, 2024 (CN) .......................... 202410734107.2

(51) Int. Cl.
*B01D 53/04* (2006.01)
*B01D 53/047* (2006.01)

(52) U.S. Cl.
CPC ..... *B01D 53/0438* (2013.01); *B01D 53/0462* (2013.01); *B01D 53/047* (2013.01); *B01D 2253/20* (2013.01); *B01D 2257/504* (2013.01); *B01D 2259/41* (2013.01)

(58) Field of Classification Search
CPC ............ B01D 53/0438; B01D 53/0462; B01D 53/047; B01D 2253/20; B01D 2257/504; B01D 2259/41
USPC ....................................................... 423/230
See application file for complete search history.

(56) References Cited

U.S. PATENT DOCUMENTS

| | | |
|---|---|---|
| 2010/0202937 A1 | 8/2010 | Lackner et al. |
| 2011/0179948 A1 | 7/2011 | Choi et al. |
| 2014/0241966 A1 | 8/2014 | Khunsupat et al. |

FOREIGN PATENT DOCUMENTS

| | | | |
|---|---|---|---|
| CN | 102198360 A | | 9/2011 |
| CN | 117085455 A | | 11/2023 |
| CN | 117379923 A | * | 1/2024 |

OTHER PUBLICATIONS

CN-117379923-A English translation (Year: 2024).*

* cited by examiner

*Primary Examiner* — Anita Nassiri-Motlagh

(57) ABSTRACT

The present disclosure provides an air carbon capture adsorption device and a low-resistance carbon capture system. The air carbon capture adsorption device includes: a support body, a heat exchange assembly, airflow dividing assemblies, an adsorption group, and external sealing assemblies; wherein the airflow dividing assemblies are provided on two sides of the support body, are communicated with the heat exchange assembly and are used to divide an airflow in an internal space of the support body while performing heat exchange in the internal space of the support body to form at least two small airflows; and the adsorption group is dispersedly filled in a space formed by the airflow dividing assemblies and the support body. The air carbon capture adsorption device can increase a porosity of a fine particle adsorbent, so that a resistance of an airflow passing through an adsorption layer is lower.

15 Claims, 11 Drawing Sheets

AIR CARBON CAPTURE ADSORPTION DEVICE AND LOW-RESISTANCE CARBON CAPTURE SYSTEM

CROSS-REFERENCE TO RELATED APPLICATION

This application claims priority from the Chinese patent application 2024107341072 filed Jun. 7, 2024, the content of which is incorporated herein in the entirety by reference.

TECHNICAL FIELD

The present disclosure relates to the field of carbon dioxide capture and resource utilization, and specifically to an air carbon capture adsorption device and a low-resistance carbon capture system, which can effectively reduce an operation resistance of a fine particle adsorbent during adsorption process and achieve rapid heating and cooling during desorption process.

BACKGROUND

Currently, the amine solution absorption method is mainly a relatively mature CCUS technology applied in the flue gas field. However, the MEA method, DEA method, MDEA method and mixed amine solution method derived therefrom all consume a large amount of energy in a solution regeneration stage, which causes the operating energy consumption of the amine solution absorption method to remain high.

In the field of air carbon capture, two technical routes are widely used: moisture swing adsorption and solid amine adsorption. The moisture swing adsorption achieves adsorption and desorption depending on the change in material humidity. Theoretically, no heating is required; however, to achieve continuous operation, it is often necessary to consume a large amount of energy to dry an adsorbent material after desorption. The solid amine technology has attracted widespread attention due to the advantages such as mild operating conditions, higher adsorption capacity, faster adsorption rate, and lower energy consumption.

However, since a solid amine fine particle adsorbent has a large operation resistance when adsorbing carbon dioxide after piling, a solid amine adsorbent requires greater power and energy consumption for adsorption, which affects the net efficiency of the carbon capture system.

Based on this, it is urgent to develop an air carbon capture adsorption device and a low-resistance carbon capture system capable of effectively reducing the operation resistance of the fine particle adsorbent during adsorption.

SUMMARY

The present disclosure aims to provide an air carbon capture adsorption device and a low-resistance carbon capture system, which are used to solve at least one technical problem in the prior art.

A technical solution of the present disclosure is as follows.

An air carbon capture adsorption device includes:
a support body;
a heat exchange assembly, provided in the support body;
airflow dividing assemblies, provided on two sides of the support body, communicated with the heat exchange assembly and used to divide an airflow in an internal space of the support body while performing heat exchange in the internal space of the support body to form at least two small airflows;
an adsorption group, dispersedly filled in a space formed by the airflow dividing assemblies and the support body and used to capture carbon by using the small airflow or to desorb by using the heat exchange assembly; and
outer sealing assemblies, provided on two sides of the support body, positioned outside the airflow dividing assemblies and used to limit a movement area of the adsorption group and pre-distribution or redistribution of a gas entering the support body.

The airflow dividing assembly includes:
at least two communicating members, staggered between an input end and an output end of the heat exchange assembly; and
an extension member, provided outside the communicating member, positioned between any two adjacent communicating members, and used to divide an airflow flowing through the extension member to form the small airflow while increasing a heat dissipation area of the communicating member; wherein
the adsorption group is arranged in the extension member and is used for carbon desorption and/or carbon capture.

The extension member includes:
a first portion, provided between the two communicating members;
a second portion, symmetrically provided with the first portion and used to form a space between the first portion and the second portion while improving a heat exchange area of the communicating member; and
the adsorption group is arranged in the space and used to ensure that a porosity of the adsorption group is controlled during carbon capture.

The extension member also includes: a connecting member; and
the connecting member is arranged between the two communicating members and in the space, and is used to adjust a distance between the two communicating members based on a temperature, thereby adjusting a shape of the first portion and/or the second portion, so as to adjust a velocity of the airflow in the space based on the temperature.

The first portion and/or the second portion is a curved surface, and is used to form an air duct with a continuously changing cross-section in the space.

The first portion and/or the second portion is an arc-shaped plate or a corrugated plate.

The first portion and/or the second portion is provided with one or more of perforations, notches, bends and spikes for increasing a turbulence of the airflow in the space.

A low-resistance carbon capture system includes:
at least one air carbon capture adsorption device described above, used to collect an external to-be-treated gas and to capture carbon from the to-be-treated gas to obtain a treated gas;
an output unit, provided at an output end of the air carbon capture adsorption device and used to discharge the treated gas;
a negative pressure device, connected to the air carbon capture adsorption device, and used to provide negative pressure when an adsorption group in the air carbon capture adsorption device is desorbed and to receive a carbon-containing gas desorbed by the air carbon capture adsorption device;

a heat source, connected to the heat exchange assembly in the air carbon capture adsorption device and used to provide heat for desorption of the adsorption group; and a cold source, connected to the negative pressure device and used to cool and separate the carbon-containing gas to obtain a separated gas.

The negative pressure device includes:

a heat exchange unit, having an input end connected to an output end of the air carbon capture adsorption device and used to cool the carbon-containing gas; and a negative pressure unit, connected to the air carbon capture adsorption device, and used to provide negative pressure for the air carbon capture adsorption device and/or the heat exchange unit to perform desorption and/or gas separation.

The low-resistance carbon capture system further includes: a compression storage assembly connected to the negative pressure device;

the compression storage assembly includes:

a buffer unit, connected to an output end of the negative pressure device and used to receive the separated gas;

a compression unit, connected to the buffer unit and used to compress the separated gas to obtain a compressed gas; and a gas storage unit, connected to the compression unit and used to store the compressed gas.

The beneficial effects of the present disclosure include at least:

The air carbon capture adsorption device according to the present disclosure includes: a support body, a heat exchange assembly, airflow dividing assemblies, an adsorption group, and external sealing assemblies; the heat exchange assembly is arranged in the support body and can heat or refrigerate an internal space of the support body, so as to meet the adsorption or desorption temperature of solid amine particles; the airflow dividing assemblies are provided on two sides of the support body, are communicated with the heat exchange assembly and are used to divide an airflow in an internal space of the support body while performing heat exchange in the internal space of the support body to form at least two small airflows; the adsorption group, such as solid amine particles, is dispersedly filled in a space formed by the airflow dividing assemblies and the support body and is used to capture carbon by using the small airflow; and the outer sealing assemblies are provided on two sides of the support body, are positioned outside the airflow dividing assemblies and are used to limit a movement area of the adsorption group and pre-distribution or redistribution of a gas entering the support body. The air carbon capture adsorption device according to the present disclosure can increase a porosity of a fine particle adsorbent, so that a resistance of an airflow passing through an adsorption layer is lower, the adsorbent contacts a gas more effectively, and the adsorption efficiency of carbon dioxide is ensured; meanwhile, the use of heat exchange assembly improves the heat exchange efficiency and saves energy consumption.

BRIEF DESCRIPTION OF DRAWINGS

In FIGS. 1-11,

1: support body; 2: heat exchange assembly; 3: airflow dividing assembly; 4: adsorption group; 5: outer sealing assembly; 10: output unit; 20: negative pressure device; 30: heat source; 40: cold source; 201: heat exchange unit; 202: negative pressure unit; 301: communicating member; 302: extension member; 501: buffer unit; 502: compression unit; 503: gas storage unit; 3021: first portion; 3022: second portion; 3023: connecting member; and 5A: through hole.

DETAILED DESCRIPTION OF EMBODIMENTS

The solid amine in the existing carbon capture system needs to be piled before operation. To increase the adsorption effect of the solid amine, and to solve the problem that when the solid amine piling in the prior art is used, since a solid amine fine particle adsorbent has a large operation resistance when adsorbing carbon dioxide after piling, a solid amine adsorbent consumes a lot of power during the adsorption process, which affects the net efficiency of the adsorption system, the present disclosure provides a low-resistance carbon capture system, which can effectively reduce an operation resistance of a fine particle adsorbent during adsorption and achieve rapid heating and cooling during desorption. The main technical solution is as follows: with the implantation of a skeleton-like structure in a material unit, a porosity of a fine particle adsorbent is increased, and a micro-vortex is formed inside the skeleton-like structure, which ultimately reduces a resistance of an airflow through an adsorption layer. The adsorbent, such as solid amine, is also more effectively in contact with the gas, and the carbon dioxide adsorption efficiency is ensured.

Specific Embodiment I

Figure 1:
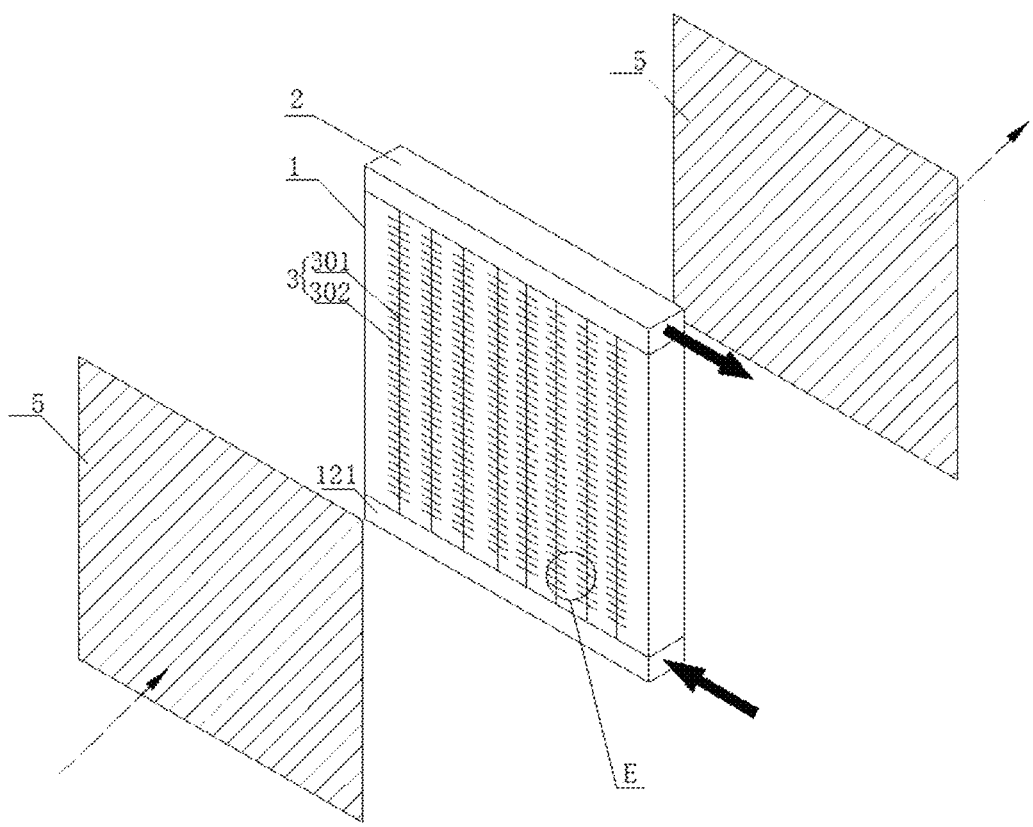
FIG. 1 is a schematic diagram of a structure of an air carbon capture adsorption device according to the present disclosure.
Figure 2:
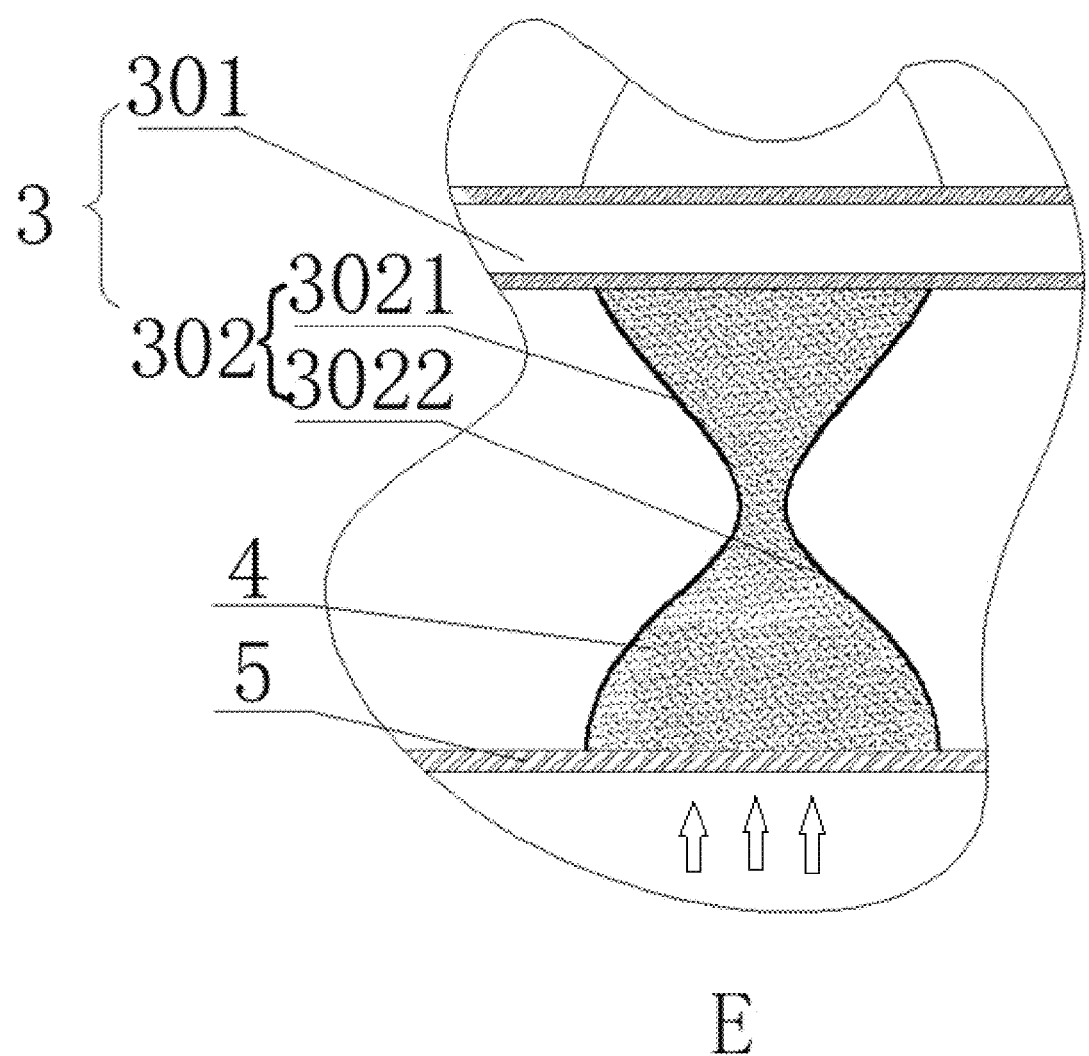
FIG. 2 is an enlarged view of E in FIG. 1.

The present disclosure provides an embodiment:

As shown in FIGS. 1-2, an air carbon capture adsorption device includes: a support body 1, a heat exchange assembly 2, airflow dividing assemblies 3, an adsorption group 4, and external sealing assemblies 5; the heat exchange assembly 2 is arranged in the support body 1 and can heat or refrigerate an internal space of the support body 1, so as to meet the adsorption or desorption temperature of solid amine particles; the airflow dividing assemblies 3 are provided on two sides of the support body 1, are communicated with the heat exchange assembly 2 and are used to divide an airflow in an internal space of the support body 1 while performing heat exchange in the internal space of the support body 1 to form at least two small airflows; the adsorption group 4, such as solid amine particles, is dispersedly filled in a space formed by the airflow dividing assemblies 3 and the support body 1 and is used to capture carbon by using the small airflow; and the outer sealing assemblies 5 are provided on two sides of the support body 1, are positioned outside the airflow dividing assemblies 3 and are used to limit a movement area of the adsorption group and prevent the adsorption group 4 from escaping from the support body 1. In FIG. 1, the solid arrows are schematic diagrams of a cooling medium or a heating medium entering the heat exchange assembly 2, and the dotted arrows are schematic diagrams of directions of gas inlet and outlet. The direction of the arrows in FIG. 2 is the direction of an airflow.

In this embodiment, the airflow dividing assembly 3 has the following two functions. In one aspect, the airflow dividing assembly connects an external heat source or cold source to the heat exchange assembly 2 to heat or cool an internal space of the support body 1; in another aspect, when an external to-be-captured gas enters the support body 1, the airflow dividing assembly 3 is used to divide the airflow entering the internal space of the support body 1 to form several small airflows, so that the airflow forms a small negative pressure area during the acceleration and deceleration process, and the adsorbent such as solid amine in small negative pressure area will be loosened and blown a little, thereby effectively reducing the operation resistance of the fine particle adsorbent during adsorption.

To achieve the above technical effects, as shown in FIG. 2, the airflow dividing assembly 3 includes: at least two communicating members 301 and an extension member 302. The communicating members 301, such as tubular connecting members, are staggered between an input end and an output end of the heat exchange assembly 2; the extension member 302 is provided outside the communicating member 301, is positioned between any two adjacent communicating members 301, and is used to divide an airflow flowing through the extension member 302 to form the small airflow while increasing a heat dissipation area of the communicating member 301; and the adsorption group 4 is arranged in the extension member 302 and is used for carbon desorption and/or carbon capture. In a specific implementation, the extension member 302 may be considered as a vortex sheet. The extension member 302 includes a first portion 3021 and a second portion 3022, wherein the first portion 3021 is provided between the two communicating members 301; and the second portion 3022 is symmetrically provided with the first portion 3021 and is used to form a space between the first portion 3021 and the second portion 3022 while improving a heat exchange area of the communicating member 301; and the adsorption group 4 is arranged in the space and is used to ensure that a porosity of the adsorption group 4 is controlled during carbon capture. Preferably, the first portion 3021 and the second portion 3022 may be formed as V-shaped members, and the surfaces of the first portion and the second portion have a curvature, and the first portion 3021 and the second portion 3022 may be fixed to the communicating member 301 by pressing, winding, welding, hot melting, bonding, or the like; a distance between two adjacent extension members 302 is 1-50 mm, which is determined based on the specifications and thermal conductivity of the adsorbent; a contact area between the combined structure of the communicating member 301 with the extension member 302 and the adsorbing material is 800 $m^2/m^3$-3000 $m^2/m^3$ and may be adjusted based on a particle size of an adsorbent; and the adsorbent has a particle size of 1 micron to 10 mm and a bulk density of 100 $kg/m^3$-1000 $kg/m^3$.

Figure 3:
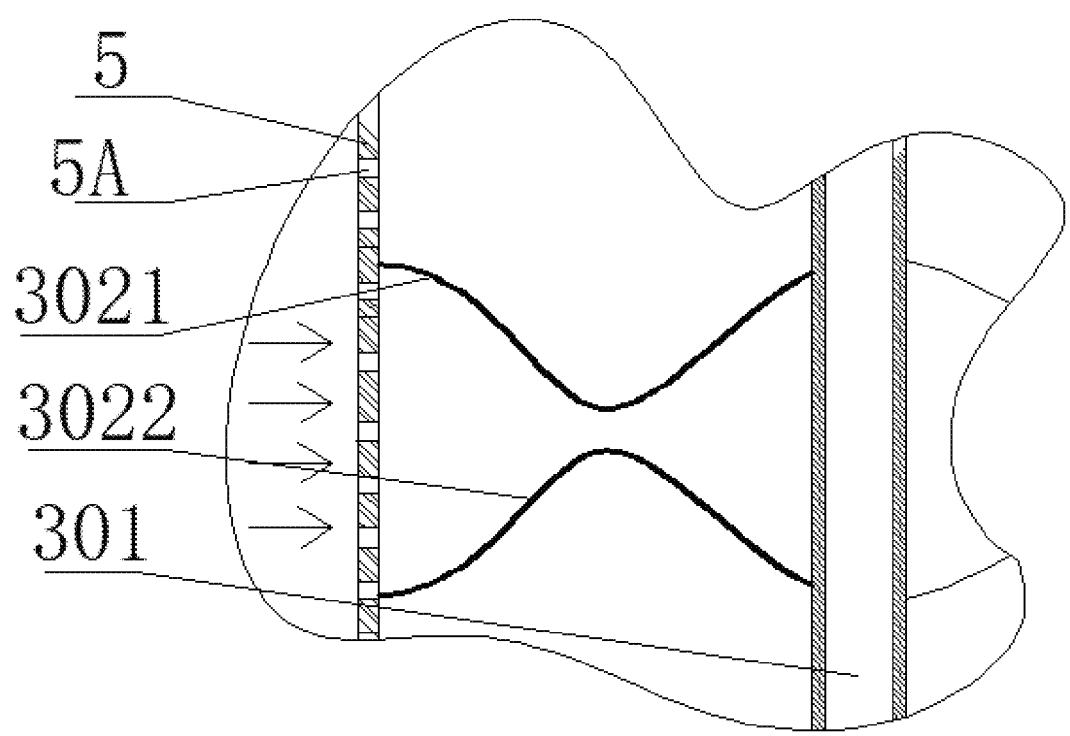
FIG. 3 is a schematic diagram of an outer sealing assembly and an airflow dividing assembly in the air carbon capture adsorption device shown in FIG. 1.
Figure 4:
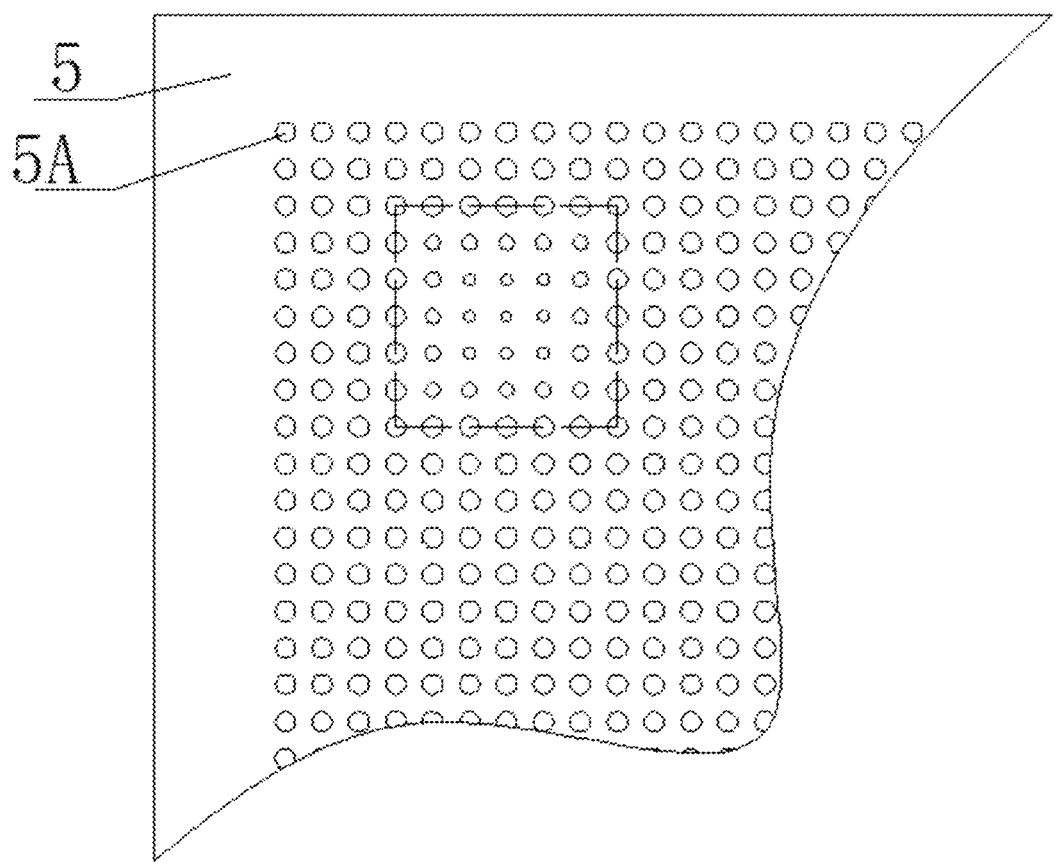
FIG. 4 is a left side view of FIG. 3.

As shown in FIGS. 3-4, the outer sealing assembly 5 is provided with a through hole 5A for gas inlet or outlet, and also for pre-distributing or redistributing a gas entering the support body. Specifically, the through hole 5A positioned outside the airflow dividing assembly 3 has the following rule: the closer the through hole 5A is to a middle of the airflow dividing assembly 3, the smaller a diameter is. According to this structure, when entering the airflow dividing assembly 3 along the through hole 5A, the airflow in the middle of the airflow dividing assembly 3 is accelerated for the first time when passing through the through hole 5A with a small aperture; when approaching the middle of the airflow dividing assembly 3, the airflow is accelerated for the second time, and the through hole 5A cooperates with the first portion 3021 and the second portion 3022 to accelerate the airflow for the second time, so that the gas entering the support body 1 can be pre-distributed or redistributed, thereby improving the gas flow power and reducing the loss. The diameter of the through hole 5A can be freely selected, and the solid amine particles are prevented from escaping on the premise of ensuring ventilation. The direction of the arrows in FIG. 3 is the direction of gas inlet.

Figure 5:
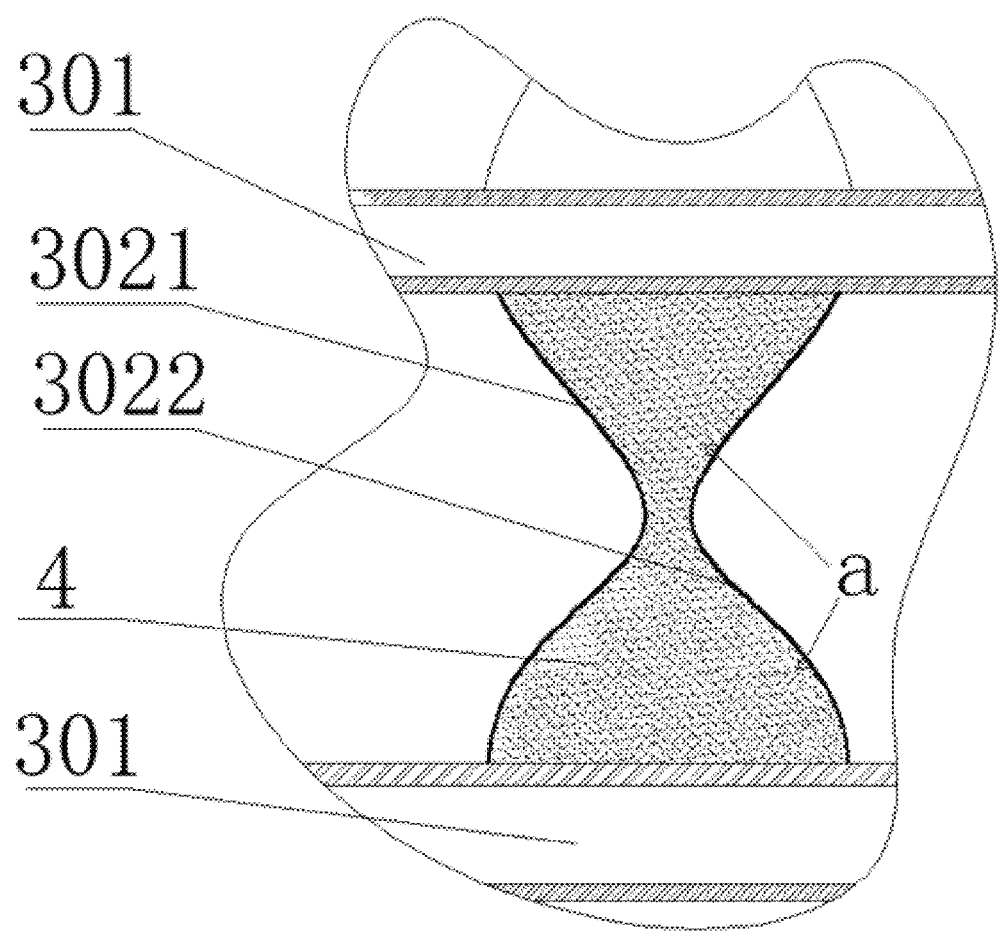
FIG. 5 is a schematic diagram of a small negative pressure area in the enlarged view of E in FIG. 1.

When in use, a to-be-captured gas, such as air or boiler flue gas, enters the interior of the support body 1 by the outer sealing assembly 5 at an input end. With the arrangement of the airflow dividing assembly 3, a large airflow containing the to-be-captured gas is divided into multiple small airflows, which enter a micro air duct formed by the communicating member 301 and the extension member 302. Since the first portion 3021 and the second portion 3022 are designed to be curved in a V-shape, the cross-section of the airflow in the micro air duct is continuously changing, which causes the airflow to continuously accelerate and decelerate during the flow, forming a small negative pressure area, such as a in FIG. 5; consequently, the adsorption group 4 positioned in the micro air duct is blown up and loosened continuously. Meanwhile, the communicating members 301 are staggered, making the airflow in the micro air duct more complicated. The airflow is continuously accelerated, decelerated and collided with the communicating member 301 in the micro air duct, so that the airflow is fully in contact with the adsorption group 4, and the gap of the adsorption group 4 is kept uniform through pneumatic flow; finally, the to-be-captured gas is purified and then passes through the outer sealing assembly 5 at the output end. Since the adsorbent represented by the adsorption group 4 has a larger pore diameter than that of the outer sealing assembly 5, the adsorbent is trapped in the support body 1 and the captured gas is output. When desorption is performed, the pressure in the support body 1 can be reduced to be close to vacuum, a heat source is introduced into the heat exchange assembly 2, and the heat exchange rate is greatly improved due to the existence of the plurality of communicating members 301. Meanwhile, the extension member 302 heats the adsorption group 4 therearound. Since the gap between the extension members 302 is small, the adsorbent filled between the extension members 302 is rapidly heated to a desorption temperature by a large contact area, and the adsorbed carbon dioxide is released. Since the desorption is performed under near-vacuum conditions, the released gas quickly expands to form micro bubbles, and a local compaction area possibly existing in the adsorption process of the adsorbent can be flushed away again, so that all the adsorbent is loosened again, thereby achieving the purpose of long-term control of the porosity.

Figure 6:
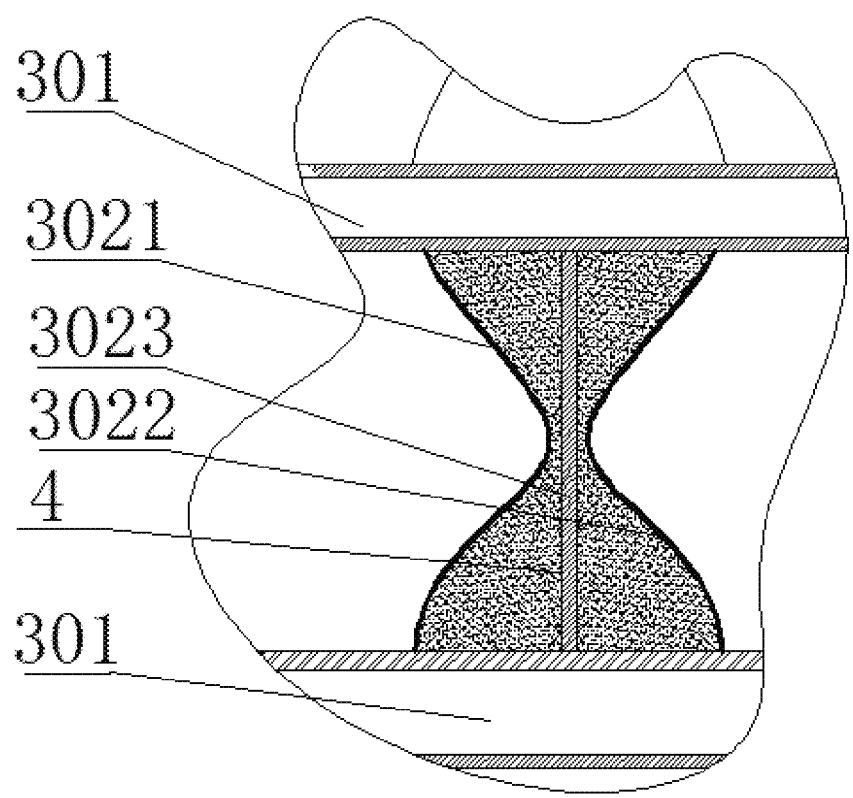
FIG. 6 is a schematic diagram of an enlarged view of E in FIG. 1 after adding a connecting member.
Figure 7:
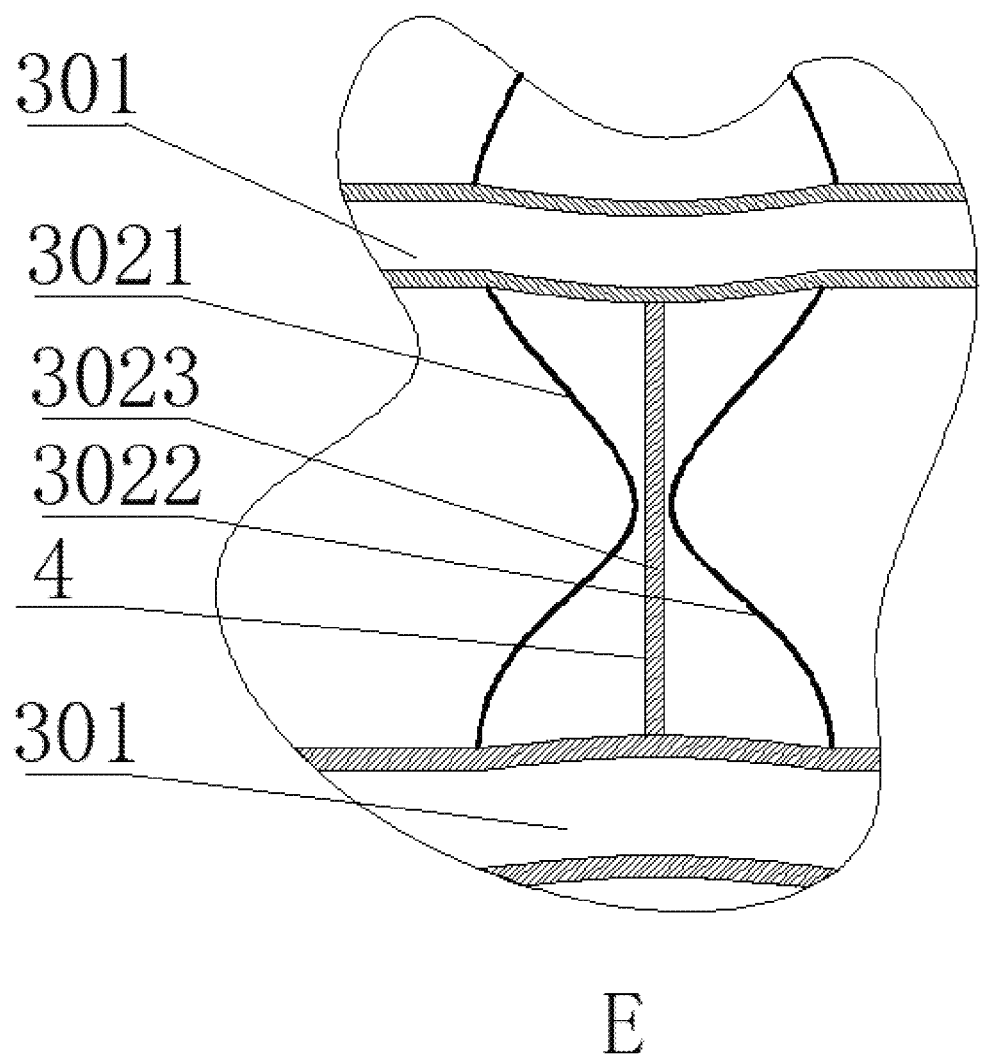
FIG. 7 is a schematic diagram of the operation of FIG. 4.

To further increase the change in the airflow velocity inside the support body 1, as shown in FIG. 6, in this embodiment, the extension member 302 is columnar or in other shapes, and further includes: a thermally sensitive connecting member 3023, which is preferably shortened after heating, changes a distance between the two communicating members 301, changes the shape of the first portion 3021 and the second portion 3022, and thus the shape of a space formed by the first portion 3021 and the second portion 3022. Specifically, the connecting member 3023 is arranged between the two communicating members 301, and in this space, a distance between the two communicating members 301 may be adjusted based to a temperature, so that the shape of the first portion 3021 and/or the second portion 3022 may be adjusted. As shown in FIG. 7, when the connecting member 3023 is shortened by heat, the distance between the two communicating members 301 is shortened, and the V-shaped tips of the first portion 3021 and the second portion 3022 are sharper; since the V-shaped tips of the first portion 3021 and the second portion 3022 form a narrow tube effect, the velocity of the airflow passing through the space formed by the first portion 3021 and the second portion 3022 is increased, so that the to-be-captured airflow is accelerated more rapidly in the flowing process, more small negative pressure areas are formed, the adsorption group 4 is continuously blown up and loosened, and the airflow resistance during the operation is reduced. Preferably, the heat-sensitive connecting members 3023 are staggered, so that the adjacent heat-sensitive connecting members 3023 are prevented from exerting forces in opposite directions on the same position of the same communicating member 301; and the heat-sensitive connecting member 3023 may be optionally made of heat-sensitive metal.

In this embodiment, the first portion 3021 and the second portion 3022 may be corrugated plates in addition to being made into an arc-shaped plate to form a V-shape.

When the first portion and the second portion are made into corrugated plates, the continuous protrusions of the corrugated plate provide a continuous take-off and landing profile for airflow along the surfaces of the first portion 3021 and the second portion 3022, so that airflow is continually accelerated and decelerated when passing through the surfaces of the first portion 3021 and the second portion 3022. When the adsorption group 4 such as solid amine particles falls, the adsorption group encounters different airflow conditions, that is, the solid amine particles are continuously accelerated or decelerated, which makes the distribution of the solid amine particles more dispersed and reduces the airflow resistance during operation.

Figure 8:
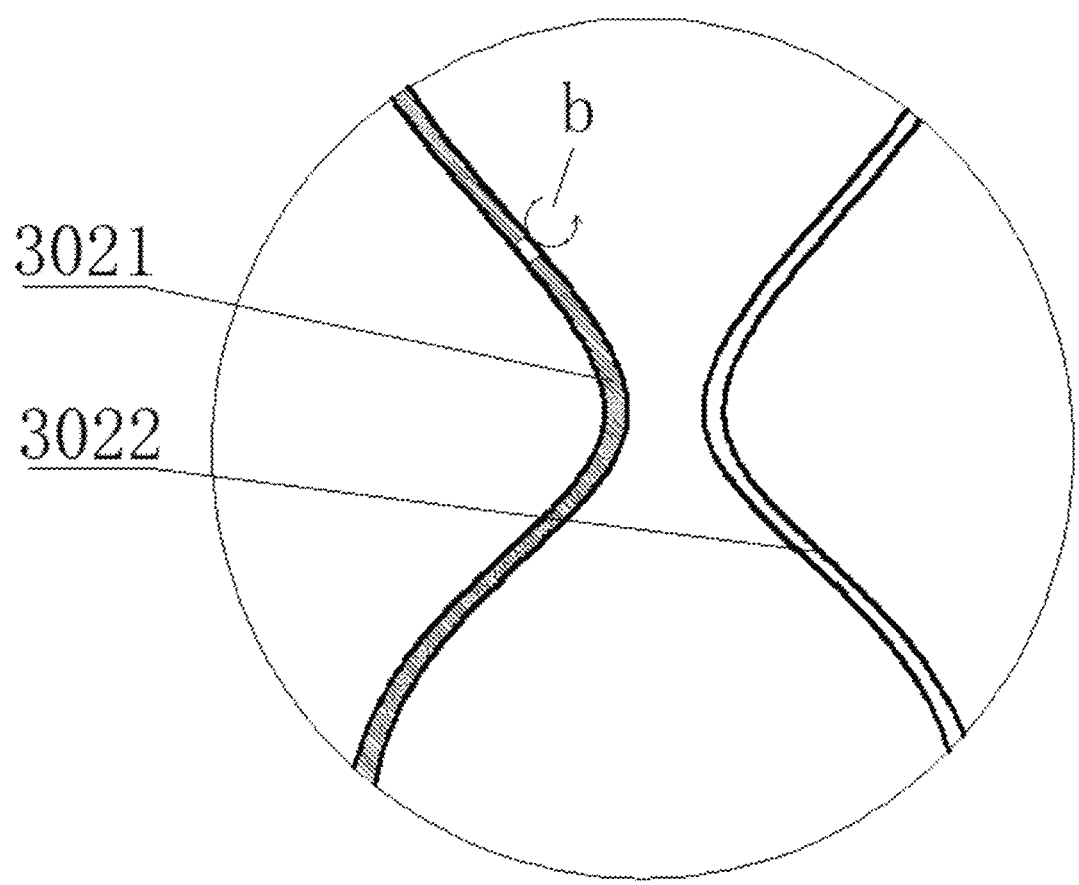
FIG. 8 is a schematic diagram of an airflow in an embodiment of an extension member.
Figure 9:
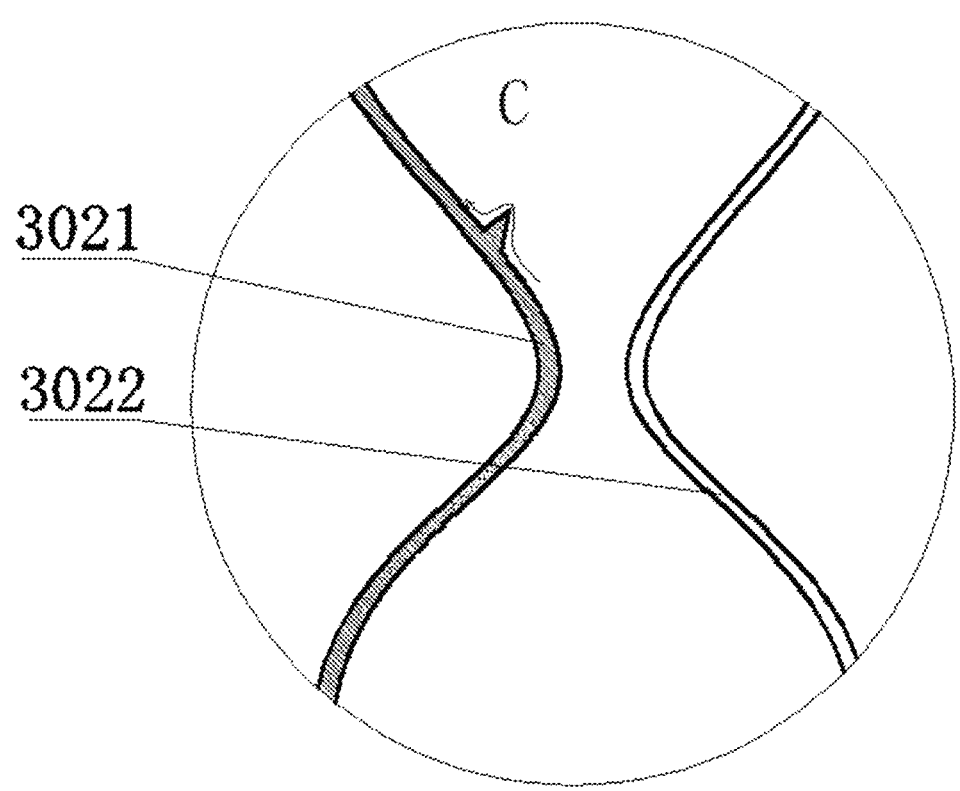
FIG. 9 is a schematic diagram of an airflow in another embodiment of an extension member.

To further increase the change of the airflow inside the support body 1, the first portion 3021 and/or the second portion 3022 are provided with perforations, notches, bends or spikes. As shown in FIG. 8, in a case that the perforations and the notches are used, when the airflow passes through the surfaces of the first portion 3021 and the second portion 3022, vortexes are formed at the notches, as shown in b in FIG. 8, if a plurality of perforations and notches exist, a plurality of vortexes are formed in the space, the turbulence of the airflow is further increased, and the carbon capturing effect is improved; when the first portion 3021 and/or the second portion 3022 is provided with bends or spikes, the bend may be similar to a protrusion structure, and since the bends or spikes protrude from the surfaces of the first portion 3021 and the second portion 3022, the airflow can be hindered from flowing smoothly when passing through the surface of the first portion 3021 and the second portion 3022, as shown in C in FIG. 9, the airflow can bend upwards along the surface to generate a vertical speed component, resulting in a ramp-up airflow, the airflow continuously climbs until reaching the top of the bent or spike protrusion, and then the airflow is forwarded again, so that different positions of the airflow have different velocities. The bents or spike protrusions are randomly arranged, so that the velocity of the airflow also randomly changes in space, further increasing the turbulence of the airflow, and improving the carbon capture effect; and the direction of the arrows in FIG. 9 is the direction of the airflow.

Specific Embodiment II

Figure 10:
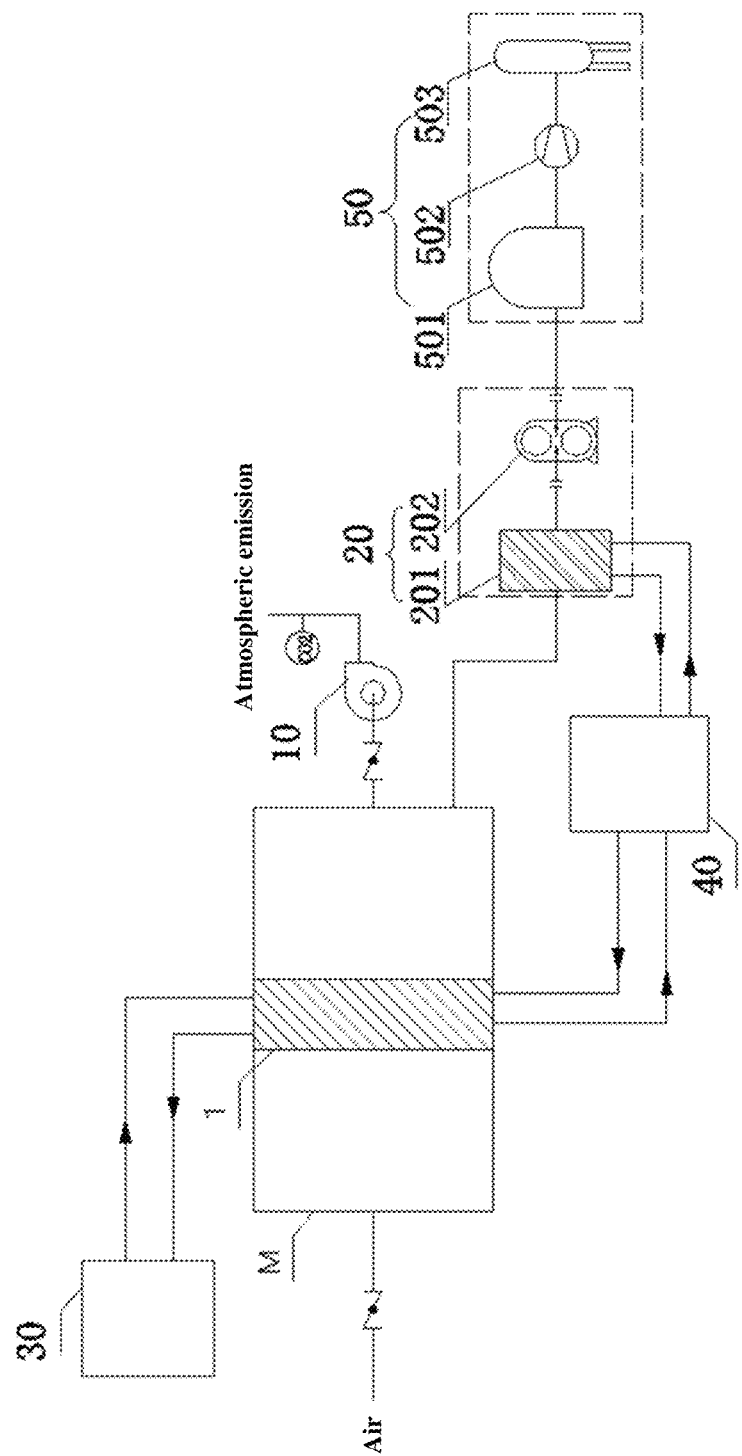
FIG. 10 is a structural block diagram of a low-resistance carbon capture system according to the present disclosure.

The present disclosure further provides an embodiment:

As shown in FIG. 10, a low-resistance carbon capture system includes: at least one air carbon capture adsorption device described in specific embodiment I, an output unit 10, a negative pressure device 20, a heat source 30, a cold source 40, and a compression storage assembly 50 connected to the negative pressure device 20; wherein the air carbon capture adsorption device is used to collect an external to-be-treated gas and capture carbon from the to-be-treated gas to obtain a treated gas; the output unit 10, such as a fan, is provided at an output end of the air carbon capture adsorption device and is used to discharge the treated gas; the negative pressure device 20, such as a vacuum pump, is connected to the air carbon capture adsorption device, and is used to provide negative pressure when an adsorption group 4 in the air carbon capture adsorption device is desorbed and to receive a carbon-containing gas desorbed by the air carbon capture adsorption device; the heat source 30 is connected to the heat exchange assembly 2 in the air carbon capture adsorption device and is used to provide heat for desorption of the adsorption group 4; and the cold source 40 is connected to the negative pressure device 20 and is used to cool and separate the carbon-containing gas to obtain a separated gas.

In this embodiment, due to the use of the air carbon capture adsorption device as described in specific embodiment I, compared with the prior art, the low-resistance carbon capture system can reduce the operation resistance of the adsorption group and improve the adsorption efficiency of carbon dioxide; in addition, the low-resistance carbon capture system can complete a desorption cycle and collect the collected carbon dioxide gas in addition to carbon capture. Moreover, since the air carbon capture adsorption device according to specific embodiment I can only capture carbon and cannot store carbon, when used, the negative pressure device 20 includes: a heat exchange unit 201 and a negative pressure unit 202; wherein the heat exchange unit 201 has an input end connected to an output end of the air carbon capture adsorption device and is used to cool the carbon-containing gas; and the negative pressure unit 202 is connected to the air carbon capture adsorption device, and is used to provide negative pressure for the air carbon capture adsorption device and/or the heat exchange unit 201 to perform desorption and/or gas separation. The compression storage assembly 50 includes: a buffer unit 501, a compression unit 502 and a gas storage unit 503; wherein the buffer unit 501 is connected to an output end of the negative pressure device 20 and is used to receive the separated gas; the compression unit 502 is connected to the buffer unit 501 and is used to compress the separated gas to obtain a compressed gas; and the gas storage unit 503 is connected to the compression unit 502 and is used to store the compressed gas. Of course, the system in this embodiment may also be provided with a gas component collecting device, a valve and the like based on a requirement.

An adsorption box body may be provided at M as shown in FIG. 10, which is used as a pressure-bearing box body, a plurality of air carbon capture adsorption devices in specific embodiment I are provided in the adsorption box body, and the air carbon capture adsorption devices are communicated with the adsorption box body in space. The vacuum pump is connected to the adsorption box body; during desorption, the inlet and outlet valves of the adsorption box body are closed, the vacuum pump is started to extract gas from the adsorption box body, and meanwhile, the adsorption unit is changed into negative pressure. FIG. 10 shows only one air carbon capture adsorption device.

When in use, a to-be-captured gas, such as air or boiler flue gas, enters the interior of the support body 1 by the outer sealing assembly 5 at an input end. With the arrangement of the airflow dividing assembly 3, a large airflow containing the to-be-captured gas is divided into multiple small airflows, which enter a micro air duct formed by the communicating member 301 and the extension member 302. Since the first portion 3021 and the second portion 3022 are designed to be curved in a V-shape, the cross-section of the airflow in the micro air duct is continuously changing, which causes the airflow to continuously accelerate and decelerate during the flow, forming a small negative pressure area; consequently, the adsorption group 4 positioned in the micro air duct is blown up and loosened continuously. Meanwhile, the communicating members 301 are staggered, making the airflow in the micro air duct more complicated. The airflow is continuously accelerated, decelerated and collided with the communicating member 301 in the micro air duct, so that the airflow is fully in contact with the adsorption group 4, and the gap of the adsorption group 4 is kept uniform through pneumatic flow; finally, the to-be-captured gas is purified and then passes through the outer sealing assembly 5 at the output end. Since the adsorbent represented by the adsorption group 4 has a larger pore diameter than that of the outer sealing assembly 5, the adsorbent is trapped in the support body 1 and the captured gas is output. When desorption is performed, the pressure in the support body 1 can be reduced to be close to vacuum, a heat source is introduced into the heat exchange assembly 2, and the heat exchange rate is greatly improved due to the existence of the plurality of communicating members 301. Meanwhile, the extension member 302 heats the adsorption group 4 therearound. Since the gap between the extension members 302 is small, the adsorbent filled between the extension members 302 is rapidly heated to a desorption temperature by a large contact area, and the adsorbed carbon dioxide is released. Since the desorption is performed under near-vacuum conditions, the released gas quickly expands to form micro bubbles, and a local compaction area possibly existing in the adsorption process of the adsorbent can be flushed away again, so that all the adsorbent is loosened again, thereby achieving the purpose of long-term control of the porosity. The desorbed gas discharged after being treated by the adsorption group 4 passes through the heat exchange unit 201, and the carbon dioxide and the condensable gas in the desorbed gas are separated by the cold energy provided by the cold source 40; then, the carbon dioxide enters the compression storage assembly 50, so that the carbon dioxide is temporarily stored in the buffer unit 501, such as a buffer tank, and then the compression unit 502 is started to compress the carbon dioxide by pressure control, and then the carbon dioxide is stored in the gas storage unit 503, so as to complete the storage of the carbon dioxide. After the desorption is completed, the heat source introduced into the airflow dividing assembly 3 is replaced by a cold source, and the adsorbent is rapidly cooled to normal temperature by a large contact area of the extension member 302, so that the adsorption performance is recovered, and one adsorption-desorption cycle is completed.

In this embodiment, the heat source 30 may supply heat through steam, hot water, hot oil, high temperature coolant, and other media. The cold source 40 can be used for refrigerating through cooling water, ethylene glycol, calcium chloride, cold oil, low-temperature coolant and other media.

Specific Embodiment III

Figure 11:
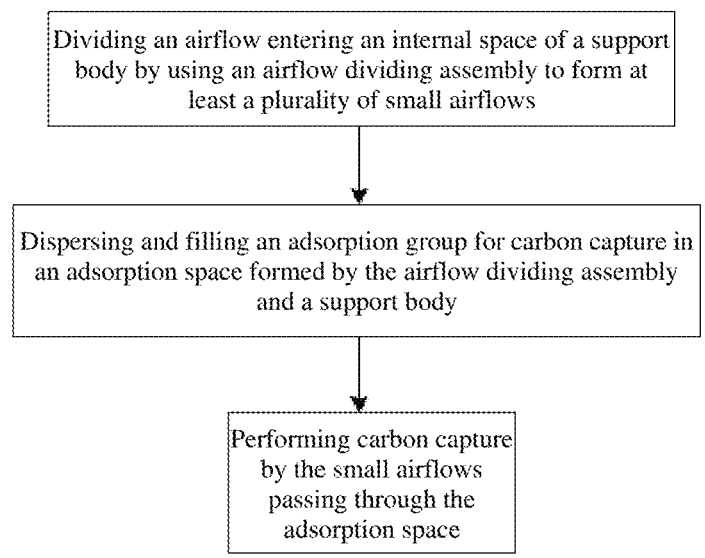
FIG. 11 is a flow chart of an air carbon capture adsorption method according to the present disclosure.

The present disclosure further provides an embodiment:
As shown in FIG. 11, an air carbon capture adsorption method, based on the air carbon capture adsorption device described in specific embodiment I, includes: dividing an airflow entering the internal space of the support body 1 by using the airflow dividing assembly 3 to form at least a plurality of small airflows; dispersing and filling the adsorption group 4 for carbon capture in an adsorption space formed by the airflow dividing assembly 3 and the support body 1; and performing carbon capture by the smaller airflows passing through the adsorption space, which can reduce the operation resistance of the adsorption group.

Specific use example: To further explain the technical means and effects adopted by the present invention to achieve the predetermined invention objectives, the following is an illustration in combination with actual engineering cases.

A 3000 $m^3$/h carbon capture system is designed based on a requirement by using the air carbon capture adsorption device in specific embodiment I; wherein 10 groups of the above air carbon capture adsorption devices are operated in parallel. Each group of air carbon capture adsorption devices has a frontal area of 1.0 m×0.8 m and a thickness of 0.1 m. The extension member 302 in the airflow dividing assembly 3 is designed with a corrugated metal sheet. The extension member 302 is spaced about 20 mm apart and is filled with a fine particle adsorbent with a particle size of about 1 mm. After testing, under the same working conditions, the material resistance of the structure without the extension member 302 and the communicating member 301 is about 150 Pa. After the device is installed and the fan is started for normal operation, a pressure drop before and after the adsorption unit is measured to be 80 Pa-90 Pa during the first operation. After three adsorption-desorption cycles, a structure formed by the extension member 302 and the communicating member 301 allows the micro bubbles released by desorption to rearrange the adsorbent in the micro air duct. Finally, the pressure drop before and after the adsorption unit is stabilized between 65 Pa-75 Pa, which saves more than 50% of the fan energy consumption.

In the desorption section, the air carbon capture adsorption device in the specific embodiment I uses a high-temperature heat pump to combine the heat source 30 and the cold source 40. When the system described in specific embodiment II enters the desorption stage, the heat pump compressor delivers high-temperature refrigerant into the pipe of the connecting member 3023 of the heat exchange unit 201. The high-temperature working medium of about 90° C. causes the extension member 302 and the communicating member 301 to heat up rapidly, and heats the adsorbent filled therearound. According to the test, it takes about 30 min to heat the material of the same thickness to 80° C. by using hot airflow. After the structure formed by the extension member 302 and the communicating member 301 is used, the adsorbent can be heated to the desorption temperature in about 5 min. The whole desorption process can be completed in about 30 min of heating and cooling, which saves 87% of the desorption time compared with the previous 240 min of hot airflow desorption method. After heating the adsorbent, the high-temperature working medium can be throttled through the expansion valve to form low-temperature working medium (or cold medium), and pump the cold medium into the heat exchanger at the inlet of the vacuum pump, which can be used to recover the system heat while removing condensable gas and improves the purity of carbon dioxide. Due to the utilization of heat sources and energy recovery, the energy consumption of the desorption process is reduced by nearly 50% compared with the desorption energy consumption of traditional hot airflow. After desorption is completed, the cooling stage begins, and the working medium in specific embodiment II is reversed in flow direction, so that the low-temperature working medium is sent to the air carbon capture adsorption device to cool the adsorbent.

In conclusion, according to the air carbon capture adsorption device in specific embodiment I, the porosity of the fine particle adsorbent is increased, and meanwhile, a micro vortex is formed inside the air carbon capture adsorption device, so that the resistance of the airflow passing through the adsorbent is lower, the adsorbent contacts a gas more effectively, and the carbon dioxide removal efficiency is ensured. Meanwhile, the low-resistance carbon capture system described in specific embodiment II, which is configured with a vacuum unit such as a vacuum pump, a carbon dioxide compressor, and the like, can convert the captured carbon dioxide gas into liquid carbon dioxide product.

The above disclosure is only a few specific implementation scenarios of the present disclosure, however, the present disclosure is not limited thereto. Any changes that can be thought of by those skilled in the art should fall within the protection scope of the present disclosure. The above serial numbers of the present disclosure are only for description and do not represent the advantages and disadvantages of the implementation scenarios.

The invention claimed is:

1. An air carbon capture adsorption device, comprising:
   a support body;
   a heat exchange assembly, provided in the support body;
   airflow dividing assemblies, provided on two sides of the support body, communicated with the heat exchange assembly and used to divide an airflow in an internal space of the support body while performing heat exchange in the internal space of the support body to form at least two small airflows;
   an adsorption group, dispersedly filled in a space formed by the airflow dividing assemblies and the support body and used to capture carbon by using the small airflow, reduce an operation resistance of the adsorption group or desorb by using heat provided by the heat exchange assembly;
   outer sealing assemblies, provided on two sides of the support body, positioned outside the airflow dividing assemblies and used to limit a movement area of the adsorption group and pre-distribution or redistribution of a gas entering the support body; wherein
   the airflow dividing assembly comprises:
   at least two communicating members, staggered between an input end and an output end of the heat exchange assembly and used to enable an airflow to continuously undergo acceleration, deceleration and collision with the communicating members in a micro air duct formed by the communicating members and an extension member, so that the airflow is fully in contact with the adsorption group, and a gap of the adsorption group is kept uniform through pneumatic flow;
   an extension member, provided outside the communicating member, positioned between any two adjacent communicating members as a vortex sheet, and used to divide an airflow flowing through the extension member to form the small airflow while increasing a heat dissipation area of the communicating member;
   the adsorption group is arranged in the extension member and is used for carbon desorption and/or carbon capture;
   the extension member comprises:
   a first portion, provided between the two communicating members;
   a second portion, symmetrically provided with the first portion and used to form a space between the first portion and the second portion while improving a heat exchange area of the communicating member; and
   the adsorption group is arranged in the space and used to ensure that a porosity of the adsorption group is controlled during carbon capture; and
   the first portion and the second portion are arranged to be V-shaped members and used to enable a cross-section of the airflow in the micro air duct to continuously change, so that the airflow is accelerated and decelerated continuously in the flowing process, a micro negative pressure area is formed, and the adsorption group in the micro air duct is blown up and loosened continuously.

2. The air carbon capture adsorption device according to claim 1, wherein the extension member also comprises: a connecting member; and
   the connecting member is arranged between the two communicating members and in the space, and is used to adjust a distance between the two communicating members based on a temperature, thereby adjusting a shape of the first portion and/or the second portion, so as to adjust a velocity of the airflow in the space based on the temperature.

3. The air carbon capture adsorption device according to claim 1, wherein the first portion and/or the second portion is a curved surface, and is used to form an air duct with a continuously changing cross-section in the space.

4. The air carbon capture adsorption device according to claim 1, wherein the first portion and/or the second portion is an arc-shaped plate or a corrugated plate.

5. The air carbon capture adsorption device according to claim 1, wherein the first portion and/or the second portion is provided with one or more of perforations, notches, bends and spikes for increasing a turbulence of the airflow in the space.

6. A low-resistance carbon capture system, comprising:
   at least one air carbon capture adsorption device according to claim 1, used to collect an external to-be-treated gas and to capture carbon from the to-be-treated gas to obtain a treated gas;
   an output unit, provided at an output end of the air carbon capture adsorption device and used to discharge the treated gas;
   a negative pressure device, connected to the air carbon capture adsorption device, and used to provide negative pressure when an adsorption group in the air carbon capture adsorption device is desorbed and to receive a carbon-containing gas desorbed by the air carbon capture adsorption device;

a heat source, connected to the heat exchange assembly in the air carbon capture adsorption device and used to provide heat for desorption of the adsorption group; and a cold source, connected to the negative pressure device and used to cool and separate the carbon-containing gas to obtain a separated gas.

7. The low-resistance carbon capture system according to claim 6, wherein the negative pressure device comprises:

a heat exchange unit, having an input end connected to an output end of the air carbon capture adsorption device and used to cool the carbon-containing gas; and a negative pressure unit, connected to the air carbon capture adsorption device, and used to provide negative pressure for the air carbon capture adsorption device and/or the heat exchange unit to perform desorption and/or gas separation.

8. The low-resistance carbon capture system according to claim 6, further comprising a compression storage assembly connected to the negative pressure device; wherein the compression storage assembly comprises:

a buffer unit, connected to an output end of the negative pressure device and used to receive the separated gas;

a compression unit, connected to the buffer unit and used to compress the separated gas to obtain a compressed gas; and a gas storage unit, connected to the compression unit and used to store the compressed gas.

9. The air carbon capture adsorption device according to claim 2, wherein the first portion and/or the second portion is a curved surface, and is used to form an air duct with a continuously changing cross-section in the space.

10. The air carbon capture adsorption device according to claim 2, wherein the first portion and/or the second portion is an arc-shaped plate or a corrugated plate.

11. The air carbon capture adsorption device according to claim 2, wherein the first portion and/or the second portion is provided with one or more of perforations, notches, bends and spikes for increasing a turbulence of the airflow in the space.

12. The low-resistance carbon capture system of claim 6, wherein the extension member also comprises: a connecting member; and the connecting member is arranged between the two communicating members and in the space, and is used to adjust a distance between the two communicating members based on a temperature, thereby adjusting a shape of the first portion and/or the second portion, so as to adjust a velocity of the airflow in the space based on the temperature.

13. The low-resistance carbon capture system of claim 6, wherein the first portion and/or the second portion is a curved surface, and is used to form an air duct with a continuously changing cross-section in the space.

14. The low-resistance carbon capture system of claim 6, wherein the first portion and/or the second portion is an arc-shaped plate or a corrugated plate.

15. The low-resistance carbon capture system of claim 6, wherein the first portion and/or the second portion is provided with one or more of perforations, notches, bends and spikes for increasing a turbulence of the airflow in the space.

* * * * *